United States Patent
Satoh et al.

(10) Patent No.: US 6,506,820 B2
(45) Date of Patent: *Jan. 14, 2003

(54) METHOD FOR MANUFACTURE OF PARTICLES FOR POWDER COATING

(75) Inventors: Haruhiko Satoh, Hirakata (JP); Yutaka Harada, Hirakata (JP); Atsushi Yamada, Hirakata (JP)

(73) Assignee: Nippon Paint Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/291,013

(22) Filed: Apr. 14, 1999

(65) Prior Publication Data

US 2002/0103274 A1 Aug. 1, 2002

(30) Foreign Application Priority Data

| Apr. 16, 1998 | (JP) | 10-106223 |
| Apr. 16, 1998 | (JP) | 10-106224 |

(51) Int. Cl.$^7$ ................ C08J 3/00; C08J 3/14
(52) U.S. Cl. ............. 523/340; 523/403; 523/404; 523/427; 523/434; 524/501; 524/503; 525/58; 525/386; 525/404; 525/407; 525/408
(58) Field of Search .................. 524/501, 503; 523/403, 427, 404, 434, 400, 340; 525/54.2, 54.21, 58, 107, 396, 391, 523, 524, 404, 407, 408

(56) References Cited

U.S. PATENT DOCUMENTS

| 5,034,432 A |   | 7/1991 | Ueno et al. |
| 5,610,269 A |   | 3/1997 | Sato et al. |
| 5,856,377 A | * | 1/1999 | Sato et al. .......... 523/201 |
| 5,898,064 A | * | 4/1999 | Harada et al. ....... 526/203 |

FOREIGN PATENT DOCUMENTS

| EP | 0250183 A2 | 6/1987 |
| EP | 0372958 A3 | 12/1989 |
| EP | 0652265 A1 | 11/1994 |

* cited by examiner

Primary Examiner—Judy M. Reddick
(74) Attorney, Agent, or Firm—Townsend & Banta

(57) ABSTRACT

A method for manufacture of particles for powder coating is disclosed in which the particles are prepared from a suspension obtained from a mixture of a thermosetting resin solution and an aqueous solution containing a water-soluble polymer. The thermosetting resin solution contains A resin, B resin and an organic solvent wherein:

(a) $0.5 \leq \{(\text{SP value of the A resin}) - (\text{SP value of the B resin})\} \leq 1.5$;

(b) $\{(\text{Tg of the A resin}) - (\text{Tg of the B resin})\} \geq 10°$ C.;

(C) $40°$ C. $\leq$ (Tg of the A resin) $\leq 100°$ C., and, $20°$ C. $\leq$ (Tg of the B resin) $\leq 50°$ C.; and (d) $5/95 \leq$ (a ratio in solids weight of the A resin to B resin) $\leq 50/50$.

6 Claims, No Drawings

METHOD FOR MANUFACTURE OF PARTICLES FOR POWDER COATING

FIELD OF THE INVENTION

The present invention relates to a method for manufacture of particles for powder coating, particles for powder coating, a method for formation of a multilayer film and a multilayer film obtained therefrom.

RELATED ART

In recent years, powder coatings which do not release organic solvents to an atmosphere have been widely noted as eco-friendly coatings. Among powder coatings, thermosetting powder coatings are advantageously used for their excellent weather resistance. However, the conventional thermosetting powder coatings providing a good appearance of a coating film suffer from the deficiency in blocking resistance, which is one of the properties associated with the storage stability. The increase in Tg of a component resin, while generally known to be effective to improve blocking resistance, results in the reduced surface smoothness of a coating film. This actually has prohibited their application to automotive bodies which demand a high-quality appearance.

Also, with the recent change of the circumstances surrounding us, a need has arisen for coating films, particularly automobile clear topcoats, which can endure an acid rain, i.e., exhibit improved acid resistance.

In order to achieve the improvement in acid resistance of powder coatings, the use of various curing systems has been attempted. However, the resulting coating films have low levels of molecular weight between cross-linkages to result in the unsuccessful improvement in acid resistance thereof.

In a parallel development, a wet process has been proposed which produces resin particles in an aqueous medium. For example, in U.S. Pat. No. 5,610,269, , use of the wet process is disclosed by which resin particles having a narrow size distribution are produced. Yet, if this technique was applied for producing particles for powder coating, it has been insufficient to achieve desired property improvements, such as in blocking resistance of particles for powder coating and in surface smoothness of a coating film prepared therefrom.

SUMMARY OF THE INVENTION

The present invention provides resin particles for powder coating which have improved blocking resistance and can be rendered into a film having a sufficient acid resistance, and a method for manufacture of such particles.

More specifically, the present invention provides a method for manufacture of spherical resin particles for powder coating in which the particles are prepared from a suspension obtained from a mixture of a thermosetting resin solution and an aqueous solution containing a water-soluble polymer. The thermosetting resin solution contains A resin, B resin and an organic solvent. The A and B resins are associated with each other such that (a) $0.5 \leq \{(\text{SP value of the A resin}) - (\text{SP value of the B resin})\} \leq 1.5$, (b) $\{(\text{Tg of the A resin}) - (\text{Tg of the B resin})\} \geq 10° \text{ C.}$, (C) $40° \text{ C.} \leq (\text{Tg of the A resin}) \leq 100° \text{ C.}$, and, $20° \text{ C.} \leq (\text{Tg of the B resin}) \leq 50° \text{ C.}$, and (d) $5/95 \leq (\text{a ratio in solids weight of the A resin to B resin}) \leq 50/50$.

The term "SP value" stands for solubility parameter value.

The present invention also provides spherical resin particles for thermosetting powder coating. The particles contain A and B resins which are associated with each other such that (a) $0.5 \leq \{(\text{SP value of the A resin}) - (\text{SP value of the B resin})\} \leq 1.5$, (b) $\{(\text{Tg of the A resin}) - (\text{Tg of the B resin})\} \geq 10° \text{ C.}$, (C) $40° \text{ C.} \leq (\text{Tg of the A resin}) \leq 100° \text{ C.}$, and, $20° \text{ C.} \leq (\text{Tg of the B resin}) \leq 50° \text{ C.}$, and (d) $5/95 \leq (\text{a ratio in solids weight of the A resin to B resin}) \leq 50/50$.

The present invention further provides a method for formation of a multilayer film which includes the steps of applying a basecoat on an undercoated or further intercoated substrate, applying a layer of the above-specified resin particles for powder coating on the basecoat overlying the substrate, and heating the substrate carrying thereon the layer of particles and the basecoat. The present invention further provides a multilayer film obtained from the practice of the above-described method.

DETAILED DESCRIPTION OF THE INVENTION

Method for Manufacture of Particles for Powder Coating

In a method for manufacture of particles for powder coating in accordance with the present invention, the particles are prepared from a suspension obtained from a mixture of a thermosetting resin solution and an aqueous solution containing a water-soluble polymer.

In the present method, the resin particles are prepared in an aqueous medium using two types of resins respectively having specified characteristic values. This results that the prepared resin particles exhibit excellent blocking resistance. In addition, a coating film prepared therefrom has an excellent surface smoothness.

This is considered due to the specific structure of the resin particles obtained by the present method, as will be described below. That is, within a shell portion of the particle surrounded by water as a dispersing medium, the A resin is considered as being present in an increased concentration relative to the B resin because the A resin has a higher SP value than the B resin. This is considered to result in the increased Tg in the shell portion than in an inner portion of the particle, leading to the improved blocking resistance thereof. On the other hand, Tg of the particle as a whole is lower than Tg of the particle shell portion, which is believed to insure a desired level of surface smoothness. Also, the use of resin having an increased molecular weight relative to those for use in conventional powder coatings results in the formation of coating film excellent in acid resistance.

The spherical thermosetting resin particles of the present invention for powder coating are manufactured in an aqueous medium. During manufacture, this technique subjects raw materials for powder coating to a reduced degree of heat, relative to a melt kneading technique well-known in the art, resulting in the production of resin particles having improved resistance to solid-phase reaction. Also, the thermosetting resin particles of the present invention for powder coating have a uniform shape of a sphere and exhibit a narrow particle size distribution. A marked reduction in amount of fine and coarse particles results in the improved workability such as transportability and transfer efficiency. In addition, the particles of the present invention, when formed into a thin film, provide a good appearance and, when recovered, can be reused like a fresh supply.

Also in the present method for manufacture of particles for powder coating, an eco-friendly recycle system can be established by the reuse of recovered particles as a fresh source. When in use, those recovered particles are dissolved into an organic solvent. This operation allows the reuse of fine particles previously regarded as a solid waste and, when combined with a filtering operation, enables the effective removal of dusts from the recovered particles.

The method for formation of a multilayer film, in accordance with the present invention, utilizes a powder coating, so that the use amount of an organic solvent can be reduced. This effect becomes remarkable particularly when water-borne coatings are used as base coatings.

Also, the multilayer film formed in accordance with the method of the present invention provides an excellent surface smoothness suitable for application to automotive bodies which demand a high-quality appearance.

A: Components for use in the Present Method

A-1: Water-soluble Polymer

One of the components for use in the present method of manufacture of particles for powder coating is a water-soluble polymer. This water-soluble polymer is classified into two types; a water-soluble polymer which does not exhibit a cloud point and a water-soluble polymer which exhibits a cloud point within the range of 30–90° C.

Examples of the water-soluble polymers which do not exhibit a cloud point include completely-saponified polyvinyl alcohol, partially-saponified polyvinyl alcohol having 85% or higher saponification level, ethyl cellulose, hydroxyethyl cellulose, polyethylene glycol and the like, whose aqueous solutions neither produce a cloud phenomenon even at elevated temperatures. The meaning of exhibiting no cloud point is that a cloud point is not lower than 100° C. because a cloud point is measured in an aqueous solution.

Examples of the water-soluble polymers which exhibit cloud points within the range of 30–90° C. include polyvinyl alcohol derivatives partially containing hydrophobic groups such as partially-saponified polyvinyl alcohol with a saponification level of lower than 85%, partially-formylated polyvinyl alcohol and ethylene-polyvinyl alcohol copolymer; cellulose derivatives such as methyl cellulose and hyroxypropyl cellulose; alkyl ethers of polyethylene glycol; block copolymers of ethylene glycol and propylene glycol and the like, whose aqueous solutions when heated all produce a cloud phenomenon within the range of 30–90° C. Also, the water-soluble-polymers which per se do not exhibit cloud points, can be modified in nature, if so desired, by the addition of a suitable electrolyte so that they exhibit cloud points within the range of 30–90° C. The water-soluble polymers which exhibit cloud points within the range of 30–90° C. may be used solely or, if necessary, in any combination thereof. When two or more water-soluble polymers which exhibit cloud points within the range of 30–90° C. are mixed to use, a cloud point of the mixture solution is generally dominated by the polymer having the lower cloud point.

An operational procedure, a particle size and a particle size distribution of resulting particles may vary depending upon whether these two types of water-soluble polymers are used solely or in combination.

A-2: Thermosetting Resin Solution

Another component for use in the method of manufacture of particles for powder coating is a thermosetting resin solution. This thermosetting resin solution contains a resin, A, a resin, B, and an organic solvent.

The A and B resins are selected to satisfy the following conditions:

(a) $0.5 \leq \{(SP \text{ value of the A resin}) - (SP \text{ value of the B resin})\} \leq 1.5$ (b) $\{(Tg \text{ of the A resin}) - (Tg \text{ of the B resin})\} \geq 10° C.$, and (C) $40° C. \leq (Tg \text{ of the A resin}) \leq 100° C.$, and, $20° C. \leq (Tg \text{ of the B resin}) \leq 50° C.$ Also, those A and B resins are cured by heat. In the case where the A and B resins are used which do not cured by heat, the thermosetting resin solution may further contain a curing agent which cures the A resin and/or the B resin by heat. The present invention encompasses such an instance.

If $\{(SP \text{ value of the A resin}) - (SP \text{ value of the B resin})\} < 0.5$, the blocking resistance of resulting particles may decrease during storage. On the other hand, if $\{(SP \text{ value of the A resin}) - (SP \text{ value of the B resin})\} > 1.5$, resulting particles, when formed into a film, may provide a reduced quality of appearance.

The SP values of the A and B resins for use in the present invention, while necessary to satisfy the above-specified relationships, are generally in the range of 9.0–12.0, preferably in the range of 9.0–11.0, more preferably in the range of 9.5–11.0. The SP value, as used herein, refers to a value for solubility parameter and can be determined by a method known to those skilled in the turbidimetry method.

If $\{(Tg \text{ of the A resin}) - (Tg \text{ of the B resin})\} < 10° C.$, the blocking resistance of resulting powders may decrease.

If (Tg of the A resin)<40° C., the blocking resistance of resulting powders may decrease during storage. On the other hand, if (Tg of the A resin)>100° C., the resulting powders, when formed into a film, provides a reduced surface smoothness. If (Tg of the B resin)<20° C., the blocking resistance of resulting powders may decrease during storage. On the other hand, if (Tg of the B resin)>50° C., the resulting powders, when formed into a film, provides a reduced surface smoothness. The Tg, as used herein, refers to a glass transition temperature which can be determined by a differential scanning calorimeter (DSC). In the case of acrylic resin, Tg can also be calculated from simultaneous equations including a given condition on a ratio of comonomeric units having known Tg's.

The specific types of the A and B resins are not particularly limited, so long as they can dissolve in an organic solvent and satisfy the above-specified conditions. The A and B resins can be chosen from those resins well-known in the art of powder coatings. Examples thereof include thermosetting resins, such as polyester resins, (meth)acrylic copolymers, copolymers of aromatic vinyls, epoxy resins and the like.

Useful polyester resins may be prepared generally by esterification of polyhydric alcohols, such as ethylene glycol, diethylene glycol and neopentyl glycol, with carboxylic acids such as terephthalic acid, isophthalic acid, adipic acid and sebacic acid.

Useful (meth)acrylic copolymers and useful copolymers of aromatic vinyls may be prepared from such comonomers as (meth)acrylic acid, methyl (meth)acrylate, ethyl (meth) acrylate, n-butyl (meth)acrylate, iso-butyl (meth)acrylate, tert-butyl (meth)acrylate, hydroxyethyl (meth)acrylate, hydroxypropyl (meth)acrylate, hydroxybutyl acrylate, glycidyl acrylate, 2-methylglycidyl methacrylate, styrene, vinyl toluene, p-chlorostyrene, for example, by using conventional copolymerization techniques.

Suitable for use as the aforementioned epoxy resins are compounds containing two or more glycidyl groups (including oxyrane groups) per molecule. Specific examples of those compounds include glycidyl ester resins; glycidyl ether resins such as a condensation product of bisphenol A and epichlorohydrin and a condensation product of bisphenol F and epichlorohydrin; alicyclic epoxy resins; linear aliphatic epoxy resins; brom-containing epoxy resins; phenol-novolac type epoxy resins; and cresol-novolac type epoxy resins.

Where the thermosetting resin solution for use in the present invention contains a curing agent, such a curing agent has a melting point preferably in the range of 50–150° C. If its melting point is below 50° C., the blocking resistance of resulting powders may decrease. On the other hand, if higher than 150° C., the resulting powders, when formed into a film, may provide a poor appearence. The curing agent can be suitably chosen from those conventionally-known in the art of powder coatings, depending upon the particular functional groups incorporated in the A and B resins used.

Where the A or B resin contains an epoxy group, useful curing agents include aliphatic polycarboxylic acids such as decanedicarboxylic acid and sebacic acid, polycarboxylic acid anhydrides, dicyandiamide, blocked isocyanates (for example, "CURELAN UI", designated in trade and manufactured by Sumitomo Bayer Urethane Co., Ltd.), amine-based curing agents, acid group-containing acrylic resins, polyamide-based curing agents, phenolic resins, imidazoles, imidazolines and the like, for example.

Where the A or B resin contains a hydroxyl group, useful curing agents include aliphatic polycarboxylic acids, aliphatic acid anhydrides, aminoplast resins, epoxy resins, polyepoxy compounds such as triglycidyl isocyanate and triglycidyl isocyanurate, blocked isocyanates, glycoluril curing agents (for example, "POWDERLINK 1174", designated in trade and manufactured by Cytec Co., Ltd.) and the like, for example. Where the A or B resin contains an acidic group, useful curing agents include epoxy resins, polyepoxy compounds such as triglycidyl isocyanate and triglycidyl isocyanurate, polyhydroxy compounds, hydroxyalkylamides (for example, "PRIMIDE XL552", designated in trade and manufactured by Rohm & Haas Co., Ltd.) and the like, for example. Any combination of the aforementioned curing agents may be employed. Suitable combinations of the A or/and B resin with the curing agent are known in the art of powder coatings.

Preferred for use as the A and B resins are acrylic resins, since they are suited to application to the multilayer film as will be hereinafter described and, when formed into a film, provide an excellent surface. In the case of acrylic resins, the improved acid resistance will be imparted to a resulting coating film, if a number average molecular weight of the A resin is in the preferred range of 2,000–4,000 and if a number average molecular weight of the B resin is in the preferred range of 5,000–10,000. It is more preferred that the A and B resins both have an epoxy group and the curing agent is polycarboxylic acid. Further incorporation of another functional group, i.e., a hydroxyl group, in the A resin results in the coating films having high crosslinking density.

Since the present invention utilizes the thermosetting resins in the form of a resin solution, a powder coating composition containing the A and B resins, if dissolved into the below-described organic solvent, can also be utilized as a source of the A and B resins. In such a case, all the components of the powder coating composition must be identified. For ease of formulation designing and recycling, the use of a powder coating is preferred which is obtained by the practice of the present method utilizing the A and B resins.

The organic solvent incorporated in the thermosetting resin solution for use in the present invention is substantially water-immiscible, i.e., exhibits 10 or lower % solubility in water and a boiling point of below 100° C. at atmospheric pressures. Alternatively, it may be of a nature to form an azeotropic mixture with water. Specific examples thereof include xylene, toluene, cyclohexane, ethyl acetate and the like.

When desired, the thermosetting resin solution for use in the present invention may further contain pigments and additives generally-employed for powder coating, other than the aforementioned substances.

Illustrative pigments include coloring pigments such as titanium dioxide, red iron oxide, yellow iron oxide, carbon black, phthalocyanine blue, phthalocyanine green, quinacridone pigment and azo- pigment; and extender pigments such as talc, silica, calcium carbonate, precipitated barium sulfate and the like.

Also, illustrative additives include surface conditioning agents such as silicones including dimethyl silicone and methyl silicone and acrylic oligomers; degassing agents as represented by benzoins such as benzoin and benzoin derivatives; plasticizers; UV absorbers; charge control agents; anti-oxidants; pigment dispersants; flame retardants; flow enhancers; and curing promoters (or curing catalysts) such as amine compounds, imidazole compounds, cationic polymerization catalysts and the like.

When curing agents, pigments, or additives to be contained in the thermosetting resin solution are insoluble in an organic solvent of the resin solution, they can be ground finely by a sand grinding mill or the like to be dispersed in the solution.

B: Operational Procedures

B-1: Sole use of Either Type of Water-soluble Polymer

In the case where either the first type of water-soluble polymer which does not exhibit a cloud point or the second type of water-soluble polymer which exhibits a cloud point within the temperature range of 30–90° C. is used solely, the below-described procedures are generally followed.

First, an aqueous solution of the first or second type of water-soluble polymer is placed in a reactor equipped with a stirrer. Subsequently added to the aqueous solution containing the water-soluble polymer is a thermosetting resin solution containing the A and B resins and an organic solvent. A ratio in solids weight of the resin A to the resin B, respectively contained in the thermosetting resin solution, is maintained within the range of 5/95–50/50. If the ratio is less than 5/95, the blocking resistance of resulting powders may decrease. On the other hand, if the ratio is greater than 50/50, resulting powders, when formed into a film, may provide a poor surface smoothness. In the case where the thermosetting resin solution further contains a curing agent, a ratio of a total solids weight of the A and B resins to a solids weight of the curing agent is preferably maintained within the range of 60/40–90/10 to insure desired curing characteristics and physical properties of resulting films.

For the purposes of obtaining a uniform mixture, the thermosetting resin solution is added so that a ratio of the weight of the water-soluble polymer containing aqueous solution to a total solids weight of the thermosetting resin solution is preferably maintained within the range of 0.5/1–3/1. If necessary, a resulting mixture is diluted with deionized water to a final concentration containing 10–50% by weight of the thermosetting resin solution.

The mixture thus obtained is then suspended under agitation supplied by a stirrer suitably selected depending upon the particular viscosity of the mixture obtained, as known to those skilled in the art, to produce particles. Subsequently, the organic solvent remaining in these particles is distilled off.

The residual organic solvent can be distilled off by the application of heat and/or reduced pressure. Taking into account the thermosetting nature of resulting particles, the distilling-off of the residual organic solvent is preferably carried out under reduced pressure and not so high temperature. Also, such distilling-off is carried out preferably until the particles are rendered into solid form.

These solid particles are then separated by using a conventional solid-liquid separating technique such as filtration or centrifuging. The separated particles are subjected to washing with water and subsequent drying to finally obtain particles for powder coating.

The resulting particles for powder coating have a volume average particle size in the range of 5–40 μm, preferably in the range of 5–30 μm, more preferably in the range of 5–20 μm. The volume average particle size and the number average particle size can be determined by a particle size measuring apparatus based on a laser light scattering method as generally used in the art of powder coatings.

B-2: Use of Both Types of Water-soluble Polymers

In the case where the first type of water-soluble polymer which does not exhibit a cloud point and the second type of water-soluble polymer which exhibits a cloud point within the temperature range of 30–90° C. are used in combination, the below-described, three successive procedures are generally followed to practice the method for manufacture of particles for powder coating in accordance with the present invention. In this case, it is conceivable that the first type of water-soluble polymer participates in control of the particle size in the suspension and the second type of water-soluble polymer participates in agglomeration of primary particles as mentioned below.

As described above, when two or more water-soluble polymers which exhibit cloud points within the range of 30–90° C. are mixed to use, a cloud point of the mixture solution is generally dominated by the polymer having the lower cloud point. Therefore, each temperature described in the following procedures is defined by the lower cloud point.

(I) Suspending process

A first process is a suspending process wherein a thermosetting resin solution containing the A and B resins and an organic solvent is added to an aqueous solution containing the aforementioned first and second types of water-soluble polymers to form a mixture which is subsequently suspended at a first temperature below the cloud point of the second type of water-soluble polymer.

In this first process, the aqueous solution containing the first type of water-soluble polymer and the second type of water-soluble polymer, as a dispersion stabilizer, is initially prepared in a reactor equipped with a stirrer. A ratio in solids weight of the first type of water-soluble polymer to the second type of water-soluble polymer is maintained preferably in the range of 99/1–10/90. The ratio, if falls outside the specified range, may result in the difficulty to control sizes of secondary particles. In order to provide a homogeneous mixture, the water-soluble polymer content of the aqueous solution ranges preferably from 0.02 to 20% by weight.

Then, the thermosetting resin solution containing the A and B resins and an organic solvent is added to the aqueous solution containing the two types of water-soluble polymers. The thermosetting resin solution can be prepared by dissolving a powder coating composition containing the A and B resins into an organic solvent, with any dust preferably being removed through filtration. Suitable proportions of the A resin, B resin and organic solvent in the thermosetting resin solution have been previously illustrated in B-1.

For the purposes of obtaining a uniform mixture of the aqueous solution containing the water-soluble polymer and the thermosetting resin solution, a ratio of a weight of the aqueous solution containing the water-soluble polymer to a total solids weight of the thermosetting resin solution is maintained preferably within the range of 0.5/1–3/1.

The mixture thus obtained is suspended by stirring at a first temperature below the cloud point of the second type of water-soluble polymer. In the particular case where any component of the thermosetting resin solution interferes with suspension thereof in the aqueous solution containing the aforementioned two types of water-soluble polymers, an aqueous solution containing the first type of water-soluble polymer, solely or in combination with a surfactant, may be first mixed with the thermosetting resin solution to form a suspension to which the second type of water-soluble polymer is subsequently added.

A resulting suspension is diluted with deionized water, if necessary, to a final concentration of 10–50% by weight of the thermosetting resin solution.

(II) Primary particle forming process

A second process is a primary particle forming process wherein the suspension obtained in the first process is heated to a second temperature higher than the first temperature but below the cloud point of the second type of water-soluble polymer to form primary particles. The primary particles obtained in the second process have a volume-average particle size preferably up to 15 μm, more preferably up to 10 μm. Such a particle size may be determined by measuring a particle size of a sample of primary particles.

(III) Secondary particle forming process

A third process is a secondary particle forming process wherein the suspension obtained in the second process is heated to a temperature equal to or higher than the cloud point of the second type of water-soluble polymer to form secondary particles.

In this process, the suspension is heated to a temperature equal to or higher than the cloud point of the second type of water-soluble polymer. The temperature may be suitably chosen depending upon the types of the water-soluble polymers used, as well as upon the property of the resin solution containing the particular thermosetting resin composition selected.

While the suspension is heated to a temperature equal to or higher than the cloud point, the primary particles agglomerate to form the secondary particles with the increasing temperature. During the process, a sample of secondary particles is periodically collected from the suspension to measure a particle size thereof. The third process can be terminated when the measured particle size comes within a purposed range.

In order to form particles having sizes within the purposed range, a technique may be employed which adjusts a ratio in weight of the first type of water-soluble polymer to the second type of water-soluble polymer. Alternatively, a technique may be employed which, once the secondary particles are formed to particle sizes within a desired range, initiates cooling of the suspension to a temperature below the cloud point of the second type of water-soluble polymer to thereby terminate the growth of secondary particles through agglomeration.

In order to impart improved properties to the resulting particles for powder coating, the primary or secondary particles are preferably heated under reduced pressure so that the organic solvent remaining therein is distilled off. This operation may be carried out during the above-described second or third process in the same manner as described in detail in B-1. Where the operation is carried out during the second process, it is desired that the organic solvent content of the primary particles is initially maintained not more than 30% by weight, preferably not more than 10% by weight, more preferably not more than 5% by weight.

The secondary particles thus formed is separated from the suspension by using a conventional solid-liquid separating technique such as filtration or centrifuging. Subsequent rinsing with water and drying thereof results in obtaining particles for powder coating.

The resulting particles for powder coating have a volume average particle size in the range of 5–40 p$\mu$, preferably in the range of 5–30 $\mu$m, more preferably in the range of 5–20 $\mu$m. Compared to the sole use of either type of water-soluble polymer, the combined use of the two types of water-soluble polymers results in (volume average particle size)/(number average particle size)$\leq 2$. As this value approaches 1, a particle size distribution becomes narrower.

Particles for Powder Coating

The particles for powder coating in accordance with the present invention contain A and B resins wherein:

(a) $0.5 \leq \{(\text{SP value of the A resin}) - (\text{SP value of the B resin})\} \leq 1.5$;

(b) $\{(\text{Tg of the A resin}) - (\text{Tg of the B resin})\} \leq 10° \text{C}$.;

(C) $40° \text{C}. \leq (\text{Tg of the A resin}) \leq 100° \text{C}$., and, $20° \text{C}. \leq (\text{Tg of the B resin}) \leq 50° \text{C}$.; and (d) $5/95 \leq (\text{a ratio in solids content of the A resin to B resin}) \leq 50/50$.

The particles for powder coating in accordance with the present invention may further include a curing agent, and optionally, pigments and additives generally employed for powder coatings.

The details of the aforementioned A and B resins, curing agent, pigments and additives have been given in the preceding description of the method for manufacture of particles for powder coating.

Since the particles for powder coating in accordance with the present invention are produced in water, they are rendered into the form of spheres having a volume average particle size in the range of 5–30 $\mu$m. If the volume average particle size thereof falls below 5 $\mu$m, the reduced transfer efficiency may result. On the other hand, if it goes beyond 30 $\mu$m, the particles, when formed into a film, may provide a poor surface smoothness.

The particles for powder coating in accordance with the present invention can be manufactured by the practice of the present method for manufacture of particles for powder coating as described above. In particular, the particles of the present invention can exhibit (volume average particle size)/(number average particle size)$\leq 2$, if properly manufactured through the following three successive processes: (I) a first process wherein a thermosetting resin solution containing the A and B resins and an organic solvent is added to an aqueous solution containing the first and second types of water-soluble polymers to form a mixture which is subsequently suspended at a first temperature below the cloud point of the second type of water-soluble polymer; (II) a second process wherein the suspension obtained in the first process is heated to a second temperature higher than the first temperature but below the cloud point to form primary particles; and (III) a third process wherein the suspension obtained in the second process is heated to a third temperature equal to or higher than the cloud point to form secondary particles. If the (volume average particle size)/(number average particle size) exceeds 2, the increased proportions of fine and coarce particles may result. This lowers workability such as transfer efficiency and transportability.

Method For Formation of a Multilayer Film

The method for formation of a multilayer film in accordance with the present invention includes the steps of applying a basecoat on an undercoated or further intercoated substrate, applying a layer of the particles of the present invention on the basecoat, and heating the substrate carrying thereon the basecoat and the layer of particles for powder coating.

The substrate for use in the present method for formation of a multilayer film is previously undercoated or further intercoated. The substrate may be formed from a plastic, iron, steel, or aluminum plate, for example. The types of the undercoat and intercoat may be selected from those known in the art, such as electrodeposition coatings and chipping resistance primers.

The basecoat may be either waterborne or solvent-based. However, the use of waterborne basecoat is preferred for its eco-friendly nature. The basecoat is applied electrostatically on the undercoated or further intercoated substrate to a thickness in the range of 10–20 $\mu$m.

The basecoat-carrying substrate is preheated with IR or a hot-air so that it is maintained at a temperature in the range of 60–100° C. for about 5–10 minutes. Thereafter, the particles for powder coating in accordance with the present invention, preferably clear particles, are electrostatically applied on the substrate to a thickness in the range of 40–80 $\mu$m, followed by baking to cure the layer of particles for powder coating and the basecoat together. A baking temperature is generally in the range of 90–250° C., preferably in the range of 100–200° C., more preferably in the range of 120–180° C. A baking time may be adjusted depending upon the particular baking temperature used.

The practice of the present method for formation of a multilayer film thus results in obtaining a multilayer film.

Recycle System

The method for manufacture of particles for powder coating in accordance with the present invention utilizes the thermosetting resin solution as a starting material. Accordingly, recovered particles such as uncoated particles remaining after the coating operation and fine or coarse particles produced during manufacture, if dissolved in an organic solvent, can be reused as a thermosetting resin solution. Since the particles of the present invention are prepared from a solution, the filtration of this solution permits the efficient removal of any existing dust of a size which has been too small to be removed in a conventional dry process used for manufacture of powder coatings. A periodic sequence of manufacture, application, recovery and manufacture can be created through the use of the thermosetting resin solution, and the repetition of such a periodic sequence results in the establishment of a recycle system.

EXAMPLES

The following Preparation Examples illustrate the preparations of the "A" resins "A-1"–"A-3", as well as the "B" resins "B-1"–"B-6".

Preparation Example 1

Preparation of Resin "A-1"

A reaction vessel equipped with a stirrer, temperature controller and reflux condenser, was charged with 63 parts by weight of xylene, placed under nitrogen atmosphere and heated to a temperature of 130° C. A charge containing the following components was dropwise added over three hours:

| | |
|---|---|
| glycidyl methacrylate: | 40 parts by weight |
| styrene: | 20 parts by weight |

-continued

| | |
|---|---|
| methyl methacrylate: | 35 parts by weight |
| 2-hydroxyethyl methacrylate: | 5 parts by weight |
| tert-butyl peroctoate: | 7 parts by weight. |

After completion of the dropwise addition, a mixture was maintained at 130° C. for another 3 hours and then cooled to a room temperature to obtain a resin "A-1" solution (solids content of 60 weight %). Also, a portion of the resin "A-1" solution was heated under reduced pressure so that an organic solvent is distilled off to provide the resin "A-1". The DSC (differential scanning calorimeter) measurement revealed a glass transition temperature (Tg) of 60° C. for the resin "A-1" obtained. The measurement according to turbidimetry revealed an SP (solubility parameter) value of 10.9.

Also, GPC (gel permeation chromatography) revealed a number average molecular weight of 3,500.

Preparation Example 2

Preparation of Resin "B-1

A reaction vessel as analogous to that used in Preparation Example 1 was charged with 63 parts by weight of xylene, placed under nitrogen atmosphere and heated to a temperature of 130° C. A charge containing the following components was dropwise added over three hours:

| | |
|---|---|
| glycidyl methacrylate: | 40 parts by weight |
| styrene: | 20 parts by weight |
| methyl methacrylate: | 20 parts by weight |
| 2-ethylhexyl methacrylate: | 20 parts by weight |
| tert-butyl peroctoate: | 7 parts by weight. |

After completion of the dropwise addition, a mixture was maintained at 130° C. for another 3 hours and cooled to a room temperature to obtain a resin "B-1" solution (solids content of 60 weight %) Also, a portion of the resin "B-1" solution was heated under vacuum so that an organic solvent is distilled off to provide the resin "B-1". The DSC (differential scanning calorimeter) measurement of the resulting resin "B-1" revealed a Tg of 30° C. Also, the measurement according to turbidimetry revealed an SP value of 9.9. Also, GPC revealed a number average molecular weight of 3,800.

Preparation Examples 3–9

Preparation of Resins "A-2", "A-3" and "B-2"–"B-6"

The procedures of the above Preparation Examples 1 and 2 were respectively followed to obtain resins "A-2", "A-3" and "B-2"–"B-6". The resins obtained were measured for the characteristic values, as analogously to Preparation Example 1. The composition and characteristic values for each resin are given in the following Table 1.

TABLE 1

| | | Prep. Exp. No. | | | | | | | | |
|---|---|---|---|---|---|---|---|---|---|---|
| | | 1 | 3 | 4 | 2 | 5 | 6 | 7 | 8 | 9 |
| | | Resin Designation | | | | | | | | |
| | | A-1 | A-2 | A-3 | B-1 | B-2 | B-3 | B-4 | B-5 | B-6 |
| Components | glycidyl methacrylate | 40 | 40 | 40 | 40 | 40 | 40 | 40 | 40 | 40 |
| | styrene | 20 | 20 | 30 | 20 | 20 | 15 | 20 | 20 | 15 |
| | methyl methacrylate | 35 | 32 | 20 | 20 | — | — | 20 | — | — |
| | n-butyl acrylate | — | 5 | — | — | — | — | — | — | — |
| | isobutyl methacrylate | — | — | 10 | — | — | 45 | — | 20 | 45 |
| | 2-ethylhexyl methacrylate | — | — | — | 20 | 40 | — | 20 | 20 | — |
| | 2-hydroxyethyl methacrylate | 5 | 3 | — | — | — | — | — | — | — |
| | tert-butyl peroctoate | 7 | 7 | 7 | 7 | 7 | 7 | 2 | 7 | 1 |
| Characteristic Values of Resins | Tg (° C.) | 60 | 60 | 63 | 30 | 15 | 40 | 35 | 30 | 40 |
| | SP Value | 10.9 | 10.6 | 10.2 | 9.9 | 9.6 | 10.1 | 9.8 | 9.9 | 10.1 |
| | Mn*) | 3500 | 3300 | 3400 | 3800 | 3400 | 3500 | 8500 | 3500 | 12000 |

Loads expressed in parts by weight
*)Mn = Number Average Molecular Weight

Example 1

The components specified below were mixed in a sand grinding mill to prepare a thermosetting resin solution.

resin "A-1" solution (solids content of 60 weight %): 14.7 parts by weight resin "B-1" solution (solids content of 60 weight %): 60.0 parts by weight 1, 10-decanedicarboxylic acid: 12.7 parts by weight polysiloxane-based surface conditioning agent ("YF-3919", designated in trade and manufactured by Toshiba Silicone Co., Ltd.): 0.3 parts by weight benzoin: 0.3 parts by weight UV absorber: 1.2 parts by weight hindered amine-based anti-oxidant: 1.0 part by weight The thermosetting resin solution was then added to an aqueous polymer containing, by weight, 8 parts of polyvinyl alcohol "GOSENOL GH-20" (designated in trade and manufactured by Nippon Gosei Kagaku Co., Ltd., saponification level of 88%, cloud point: not exhibited) and 90 parts of deionized water. A resulting mixture was rendered into a suspension by using a homogenizer at 25° C. The suspension was diluted by the addition of 300 parts by weight of deionized water, and then transferred to a reaction vessel equipped with a stirrer, temperature controller, reflux condenser and vacuum apparatus.

The suspension was reduced in pressure to 30 Torr. and heated to 35° C., so that an organic solvent in a dispersed phase was completely distilled off. The suspension was then cooled and filtered under suction to collect particles which were subsequently vacuum dried at 30° C. to obtain particles for powder coating. The particle size determination using a Coulter Counter (manufactured by Coulter Electronics Co., Ltd.) revealed a volume average particle size of 10.1 μm and a number average particle size of 3.5 μm. Accordingly, the value of (volume average particle size)/(number average particle size) is 2.9.

Example 2

The thermosetting resin solution obtained in Example 1 was added to an aqueous polymer containing, by weight, 6 parts of polyvinyl alcohol "GOSENOL GH-20" (designated in trade and manufactured by Nippon Gosei Kagaku Co., Ltd., saponification level of 88%, cloud point: not exhibited), 3 parts of polyvinyl alcohol "GOSENOL KL-05" (designated in trade and manufactured by Nippon Gosei Kagaku Co., Ltd., saponification level of 80%, cloud point: about 80° C.), 1 part of hydroxypropyl cellulose (cloud point: about 50° C.) and 90 parts of deionized water. A resulting mixture was rendered into a suspension by using a homogenizer at 25° C. The suspension was then diluted by addition of 300 parts by weight of deionized water, and transferred to a reaction vessel equipped with a stirrer, temperature controller, reflux condenser and vacuum apparatus.

The suspension was reduced in pressure to 30 Torr. and heated to 35° C., to obtain primary particles having a volume average particle size of 4.2 μm, which contained 3% of xylene. The suspension was then reduced in pressure to 140 Torr. and heated to 60° C., so that an organic solvent in a dispersed phase was completely distilled off. The suspension was then cooled and filtered under suction to collect particles which were subsequently vacuum dried at 30° C. to obtain secondary particles for powder coating. The particle size thereof was determined in the same manner as in Example 1. Results indicated a volume average particle size of 13.3 μm and a number average particle size of 10.5 μm. Accordingly, the value of (volume average particle size)/ (number average particle size) is 1.3.

Example 3

The procedure of Example 1 was followed to prepare a thermosetting resin solution, except that, instead of resin "A-1" solution, resin "A-2" solution was used having the equivalent solids weight. The procedure of Example 2 was then followed utilizing this thermosetting resin solution to obtain particles for powder coating. A volume average particle size of primary particles was determined as being 3.7 μm. A volume average particle size and a number average particle size of secondary particles were determined as being 12.9 μm and 7.6 μm, respectively. Accordingly, the value of (volume average particle size)/(number average particle size) is 1.7.

Example 4

The components specified below were mixed in a sand grinding mill to prepare a thermosetting resin solution.
  resin "A-1" solution (solids content of 60 weight %) : 8.2 parts by weight
  resin "B-3" solution (solids content of 60 weight %): 76.5 parts by weight
  1, 10-decanedicarboxylic acid: 12.7 parts by weight
  polysiloxane-based surface conditioning agent ("YF-3919", designated in trade and manufactured by Toshiba Silicone Co., Ltd.): 0.1 parts by weight
  benzoin: 0.3 parts by weight
  UV absorber: 1.2 parts by weight
  hindered amine-based anti-oxidant: 1.0 part by weight The thermosetting resin solution was then added to an aqueous polymer containing, by weight, 5 parts of polyvinyl alcohol "GOSENOL GH-20" (designated in trade and manufactured by Nippon Gosei Kagaku Co., Ltd., saponification level of 88%, cloud point: not exhibited), 4 parts of polyvinyl alcohol "GOSENOL KL-05" (designated in trade and manufactured by Nippon Gosei Kagaku Co., Ltd., saponification level of 80%, cloud point: about 80° C.), 2 parts of hydroxypropyl cellulose (cloud point: about 50° C.) and 90 parts of deionized water. A resulting mixture was rendered into a suspension by using a homogenizer at 25° C. The suspension was diluted by the addition of 300 parts by weight of deionized water, and then transferred to a reaction vessel equipped with a stirrer, temperature controller, reflux condenser and vacuum apparatus.

The suspension was reduced in pressure to 30 Torr. and heated to 35° C., to obtain primary particles having a volume average particle size of 3.9 μm, which contained 4% of xylene. The suspension was then reduced in pressure to 140 Torr. and heated to 60° C., so that an organic solvent in a dispersed phase was completely distilled off. The suspension was then cooled and filtered under suction to collect particles which were subsequently vacuum dried at 30° C. to obtain secondary particles for powder coating. The size of the resulting particles was determined in the same manner as in Example 1. Results indicated a volume average particle size of 12.3 μm and a number average particle size of 8.4 μm. Accordingly, the value of (volume average particle size)/(number average particle size) is 1.5.

Example 5

The procedure of Example 1 was followed to obtain a thermosetting resin solution as well as particles for powder coating, except that, instead of resin "B-1" solution, resin "B-4" solution, equivalent thereto in Tg, SP value and solids weight but different therefrom in number average molecular weight, was used. A volume average particle size and a number average particle size of the resulting particles were determined as being 10.1 μm and 3.5 μm, respectively. Accordingly, the value of (volume average particle size)/ (number average particle size) is 2.9.

Example 6

The procedure of Example 2 was followed utilizing the thermosetting resin solution prepared in Example 5 to obtain particles for powder coating. A volume average particle size of primary particles was determined as being 4.2 μm. A volume average particle size and a number average particle size of secondary particles were determined as being 13.3 μm and 10.5 μm, respectively. Accordingly, the value of (volume average particle size)/(number average particle size) is 1.3.

Example 7

The procedure of Example 5 was followed to prepare a thermosetting resin solution, except that, instead of resin "A-1" solution, resin "A-2" solution was used having the equivalent solids weight. The procedure of Example 2 was then followed utilizing this thermosetting resin solution to obtain particles for powder coating. A volume average particle size and a number average particle size of the resulting particles were determined as being 12.9 μm and 7.6 μm, respectively. Accordingly, the value of (volume average particle size)/(number average particle size) is 1.7.

Example 8

The components specified below were mixed in a sand grinding mill to prepare a thermosetting resin solution.

resin "A-1" solution (solids content of 60 weight %) : 8.2 parts by weight resin "B-4" solution (solids content of 60 weight %): 76.5 parts by weight 1, 10-decanedicarboxylic acid: 12.7 parts by weight polysiloxane-based surface conditioning agent ("YF-3919", designated in trade and manufactured by Toshiba Silicone Co., Ltd.): 0.1 parts by weight benzoin: 0.3 parts by weight UV absorber: 1.2 parts by weight hindered amine-based anti-oxidant: 1.0 part by weight The thermosetting resin solution was then added to an aqueous polymer containing, by weight, 5 parts of polyvinyl alcohol "GOSENOL GH-20" (designated in trade and manufactured by Nippon Gosei Kagaku Co., Ltd., saponification level of 88%, cloud point: not exhibited), 4 parts of polyvinyl alcohol "GOSENOL KL-05" (designated in trade and manufactured by Nippon Gosei Kagaku Co., Ltd., saponification level of 80%, cloud point: about 80° C.), 2 parts of hydroxypropyl cellulose (cloud point: about 50° C.) and 90 parts of deionized water. A resulting mixture was rendered into a suspension by using a homogenizer at 25° C. The suspension was diluted by the addition of 300 parts by weight of deionized water, and then transferred to a reaction vessel equipped with a stirrer, temperature controller, reflux condenser and vacuum apparatus.

The suspension was reduced in pressure to 30 Torr. and heated to 35° C., to obtain primary particles having a volume average particle size of 3.9 μm, which contained 3% of xylene. The suspension was then reduced in pressure to 140 Torr. and heated to 60° C., so that an organic solvent in a dispersed phase was completely distilled off. The suspension was then cooled and filtered under suction to collect particles which were subsequently vacuum dried at 30° C. to obtain secondary particles for powder coating. Sizes of the resulting particles were determined in the same manner as in Example 1. Results revealed a volume average particle size of 12.3 μm and a number average particle size of 8.4 μm. Accordingly, the value of (volume average particle size)/(number average particle size) is 1.5.

Comparative Example 1

The procedure of Example 1 was followed to prepare a thermosetting resin solution, except that, instead of resin "A-1" solution, resin "A-3" solution was used having the equivalent solids weight. The procedure of Example 2 was then followed utilizing this thermosetting resin solution to obtain particles for powder coating. Sizes of the resulting particles were determined in the same manner as in Example 1. A volume average particle size of primary particles was determined as being 4.2 μm. A volume average particle size and a number average particle size of secondary particles were determined as being 14.0 μm and 10.2 μm, respectively. Accordingly, the value of (volume average particle size)/(number average particle size) is 1.4.

Comparative Example 2

The procedure of Example 1 was followed to prepare a thermosetting resin solution, except that, instead of resin "B-1" solution, resin "B-2" solution was used having the equivalent solids weight. The procedure of Example 2 was then followed utilizing this thermosetting resin solution to obtain particles for powder coating. Sizes of the resulting particles were determined in the same manner as in Example 1. A volume average particle size of primary particles was determined as being 3.8 μm. A volume average particle size and a number average particle size of secondary particles were determined as being 15.7 μm and 9.8 μm, respectively. Accordingly, the value of (volume average particle size)/(number average particle size) is 1.6.

Comparative Example 3

The components specified below were mixed in a Henschel mixer to prepare a thermosetting resin composition.

resin "A-1" solid: 9.1 parts by weight resin =B-1" solid: 37.2 parts by weight 1,10-decanedicarboxylic acid: 12.7 parts by weight polysiloxane-based surface conditioning agent (YF-3919", designated in trade and manufactured by Toshiba Silicone Co., Ltd.): 0.1 parts by weight benzoin: 0.3 parts by weight UV absorber: 1.2 parts by weight hindered amine-based anti-oxidant: 1.0 part by weight The resin composition obtained was dispersively melt kneaded by a Buss Cokneader, coarsely divided again by the Henschel mixer, further divided by a hammer mill and finely divided by a jet mill into particles for powder coating. Sizes of the resulting particles were determined in the same manner as in Example 1. Results revealed a volume average particle size of 13 μm and a number average particle size of 2.8 μm. Accordingly, the value of (volume average particle size)/(number average particle size) is 4.6.

Comparative Example 4

The components specified below were mixed in a sand grinding mill to prepare a thermosetting resin solution.

resin "B-1" solution (solids content of 60 weight %) 84.7 parts by weight 1, 10-decanedicarboxylic acid: 12.7 parts by weight polysiloxane-based surface conditioning agent ("YF-3919", designated in trade and manufactured by Toshiba Silicone Co., Ltd.): 0.1 parts by weight benzoin: 0.3 parts by weight UV absorber: 1.2 parts by weight hindered amine-based anti-oxidant: 1.0 part by weight The thermosetting resin solution was then added to an aqueous polymer containing, by weight, 6 parts of polyvinyl alcohol "GOSENOL GH-20" (designated in trade and manufactured by Nippon Gosei Kagaku Co., Ltd., saponification level of 88%, cloud point: not exhibited), 3 parts of polyvinyl alcohol "GOSENOL KL-05" (designated in trade and manufactured by Nippon Gosei Kagaku Co., Ltd., saponification level of 80%, cloud point: about 80° C.), 1 part of hydroxypropyl cellulose (cloud point: about 50° C.) and 90 parts of deionized water. A resulting mixture was rendered into a suspension by using a homogenizer at 25° C. The suspension was diluted by the addition of 300 parts by weight of deionized water, and then transferred to a reaction vessel equipped with a stirrer, temperature controller, reflux condenser and vacuum apparatus.

The suspension reduced in pressure to 30 Torr. and heated to 35° C., to obtain primary particles having a volume average particle size of 4.2 μm, which contained 4% of xylene. The suspension was then was reduced in pressure to 140 Torr. and heated to 60° C., so that an organic solvent in a dispersed phase was completely distilled off. The suspension was then cooled and filtered under suction to collect particles which were subsequently vacuum dried at 30° C. to obtain secondary particles for powder coating. Sizes of the resulting particles were determined in the same manner as in Example 1. Results revealed a volume average particle size of 15.1 μm and a number average particle size of 9.8 μm. Accordingly, the value of (volume average particle size)/ (number average particle size) is 1.5.

Comparative Example 5

The components specified below were mixed in a sand grinding mill to prepare a thermosetting resin solution.
resin "A-1" solution (solids content of 60 weight %): 44.7 parts by weight
resin "B-1" solution (solids content of 60 weight %): 40.0 parts by weight
1, 10-decanedicarboxylic acid: 12.7 parts by weight
polysiloxane-based surface conditioning agent ("YF-3919", designated in trade and manufactured by Toshiba Silicone Co., Ltd.): 0.1 parts by weight
benzoin: 0.3 parts by weight
UV absorber: 1.2 parts by weight
hindered amine-based anti-oxidant: 1.0 part by weight The procedure of Example 1 was followed utilizing this thermosetting resin solution to prepare particles for powder coating. Sizes of the resulting particles were determined in the same manner as in Example 1. Results revealed a volume average particle size of 12.4 μm and a number average particle size of 4.0 μm. Accordingly, the value of (volume average particle size)/(number average particle size) is 3.1.

Comparative Example 6

The procedure of Example 5 was followed to prepare a thermosetting resin solution, except that, instead of resin "A-1" solution, resin "A-3" solution was used having the equivalent solids weight. The procedure of Example 2 was then followed utilizing this thermosetting resin solution to obtain particles for powder coating. Sizes of the resulting particles were determined in the same manner as in Example 1. A volume average particle size of primary particles was determined as being 4.2 μm. A volume average particle size and a number average particle size of secondary particles were determined as being 14.0 μm and 10.2 μm, respectively. Accordingly, the value of (volume average particle size)/(number average particle size) is 1.4.

Comparative Example 7

The procedure of Example 5 was followed to prepare a thermosetting resin solution, except that, instead of resin "B-4" solution, resin "B-5" solution was used having the equivalent solids weight. The procedure of Example 2 was then followed utilizing this thermosetting resin solution to obtain particles for powder coating. Sizes of the resulting particles were determined in the same manner as in Example 1. A volume average particle size of primary particles was determined as being 3.8 μm. A volume average particle size and a number average particle size of secondary particles were determined as being 15.7 μm and 9.8 μm, respectively. Accordingly, the value of (volume average particle size)/ (number average particle size) is 1.6.

Comparative Example 8

The components specified below were mixed in a sand grinding mill to prepare a thermosetting resin solution.

resin "A-1" solution (solids content of 60 weight %): 8.2 parts by weight
resin "B-6" solution (solids content of 60 weight %): 76.5 parts by weight
1, 10-decanedicarboxylic acid: 12.7 parts by weight
polysiloxane-based surface conditioning agent ("YF-3919", designated in trade and manufactured by Toshiba Silicone Co., Ltd.): 0.1 parts by weight
benzoin: 0.3 parts by weight
UV absorber: 1.2 parts by weight
hindered amine-based anti-oxidant: 1.0 part by weight The thermosetting resin solution was then added to an aqueous polymer containing, by weight, 5 parts of polyvinyl alcohol "GOSENOL GH-20" (designated in trade and manufactured by Nippon Gosei Kagaku Co., Ltd., saponification level of 88%, cloud point: not exhibited), 4 parts of polyvinyl alcohol "GOSENOL KL-05" (designated in trade and manufactured by Nippon Gosei Kagaku Co., Ltd., saponification level of 80%, cloud point: about 80° C.), 2 parts of hydroxypropyl cellulose (cloud point: about 50° C.) and 90 parts of deionized water. A resulting mixture was rendered into a suspension by using a homogenizer at 25 C. The suspension was diluted by the addition of 300 parts by weight of deionized water, and then transferred to a reaction vessel equipped with a stirrer, temperature controller, reflux condenser and vacuum apparatus.

The suspension was reduced in pressure to 30 Torr. and heated to 35° C., to obtain primary particles having a volume average particle size of 3.9 μm, which contained 3% of xylene. The suspension was then reduced in pressure to 140 Torr. and heated to 60° C., so that an organic solvent in a dispersed phase was completely distilled off. The suspension was then cooled and filtered under suction to collect secondary particles which were subsequently vacuum dried at 30° C. to obtain particles for powder coating. Sizes of the resulting particles were determined in the same manner as in Example 1. Results revealed a volume average particle size of 12.3 μm and a number average particle size of 8.4 μm. Accordingly, the value of (volume average particle size)/ (number average particle size) is 1.5.

Comparative Example 9

The components specified below were mixed in a Henschel mixer to prepare a thermosetting resin composition.
resin "A-1" solid: 9.1 parts by weight
resin "B-4" solid: 37.2 parts by weight
1, 10-decanedicarboxylic acid: 12.7 parts by weight
polysiloxane-based surface conditioning agent ("YF-3919", designated in trade and manufactured by Toshiba Silicone Co., Ltd.): 0.1 parts by weight
benzoin: 0.3 parts by weight
UV absorber: 1.2 parts by weight
hindered amine-based anti-oxidant: 1.0 part by weight The resin composition obtained was dispersively melt kneaded by a Buss Cokneader, coarsely divided again by the Henschel mixer, further divided by a hammer mill and finely divided by a jet mill into particles for powder coating. Sizes of the resulting particles were determined in the same manner as in Example 1. Results revealed a volume average particle size of 13 μm and a number average particle size of 2.8 μm. Accordingly, the value of (volume average particle size)/(number average particle size) is 4.6.

Comparative Example 10

The components specified below were mixed in a sand grinding mill to prepare a thermosetting resin solution.

resin "B-4" solution (solids content of 60 weight %): 84.7 parts by weight 1, 10-decanedicarboxylic acid: 12.7 parts by weight polysiloxane-based surface conditioning agent ("YF-3919", designated in trade and manufactured by Toshiba Silicone Co., Ltd.): 0.1 parts by weight benzoin: 0.3 parts by weight UV absorber: 1.2 parts by weight hindered amine-based anti-oxidant: 1.0 part by weight The thermosetting resin solution was then added to an aqueous polymer containing, by weight, 6 parts of polyvinyl alcohol "GOSENOL GH-20" (designated in trade and manufactured by Nippon Gosei Kagaku Co., Ltd., saponification level of 88%, cloud point: not exhibited), 3 parts of polyvinyl alcohol "GOSENOL KL-05" (designated in trade and manufactured by Nippon Gosei Kagaku Co., Ltd., saponification level of 80%, cloud point: about 80° C.), 1 part of hydroxypropyl cellulose (cloud point: about 50° C.) and 90 parts of deionized water. A resulting mixture was rendered into a suspension by using a homogenizer at 25° C. The suspension was diluted by the addition of 300 parts by weight of deionized water, and then transferred to a reaction vessel equipped with a stirrer, temperature controller, reflux condenser and vacuum apparatus.

The suspension was reduced in pressure to 30 Torr. and heated to 35° C., to obtain primary particles having a volume average particle size of 4.2 μm, which contained 4% of xylene. The suspension was then reduced in pressure to 140 Torr. and heated to 60° C., so that an organic solvent in a dispersed phase was completely distilled off. The suspension was then cooled and filtered under suction to collect particles which were subsequently vacuum dried at 30° C. to obtain secondary particles for powder coating. Sizes of the resulting particles were determined in the same manner as in Example 1. Results revealed a volume average particle size of 15.1 μm and a number average particle size of 9.8 μm. Accordingly, the value of (volume average particle size)/(number average particle size) is 1.5.

Comparative Example 11

The components specified below were mixed in a sand grinding mill to prepare a thermosetting resin solution.

resin "A-1" solution (solids content of 60 weight %): 44.7 parts by weight resin "B-4" solution (solids content of 60 weight %): 40.0 parts by weight 1, 10-decanedicarboxylic acid: 12.7 parts by weight polysiloxane-based surface conditioning agent ("YF-3919", designated in trade and manufactured by Toshiba Silicone Co., Ltd.): 0.1 parts by weight benzoin: 0.3 parts by weight UV absorber: 1.2 parts by weight hindered amine-based anti-oxidant: 1.0 part by weight The procedure of Example 1 was followed utilizing this thermosetting resin solution to prepare particles for powder coating. Sizes of the resulting particles were determined in the same manner as in Example 1. Results revealed a volume average particle size of 12.4 μm and a number average particle size of 4.0 μm. Accordingly, the value of (volume average particle size)/(number average particle size) is 3.1

Evaluation Tests

The particles for powder coating, respectively obtained in the above Examples and Comparative Examples, were evaluated for properties specified below. Those particles for powder coating, respectively obtained in the above Examples 5–8 and Comparative Examples 6–11, were further evaluated for crosslinking density and acid resistance of a coating film. Results are given in the following Tables 2 and 3. In tables 2 and 3, "x" in "NSIC reduction" indicates that an NSIC value (%) could not be measured due to its high content of coarse particles which makes difficult an application thereof.

TABLE 2

|  |  | Example No. | | | | Comp. Example No. | | | | |
|---|---|---|---|---|---|---|---|---|---|---|
|  |  | 1 | 2 | 3 | 4 | 1 | 2 | 3 | 4 | 5 |
| Surface Smoothness NSIC (%) | on an Iron Plate | 75 | 82 | 80 | 78 | 80 | 85 | 78 | 85 | 60 |
|  | on a Basecoat | 68 | 74 | 74 | 71 | 73 | 77 | 70 | 74 | 50 |
| Blocking Resistance | Mesh Pass Rate (%) | 96 | 99 | 99 | 100 | 45 | 30 | 40 | 20 | 99 |
| Resistance to Solid Phase Reaction | Mw*) Change Rate (%) | 1.02 | 1.02 | 1.01 | 1.01 | 1.02 | 1.02 | 1.40 | 1.01 | 1.02 |
|  | NSIC Reduction (%) | 2 | 2 | 1 | 1 | X | X | X | X | 2 |

*) MW = Weight Average Molecular Weight

TABLE 3

|  |  | Example No. | | | | Comp. Example No. | | | | | |
|---|---|---|---|---|---|---|---|---|---|---|---|
|  |  | 5 | 6 | 7 | 8 | 6 | 7 | 8 | 9 | 10 | 11 |
| Surface Smoothness NSIC (%) | on an Iron Plate | 75 | 82 | 83 | 85 | 80 | 83 | 55 | 80 | 85 | 60 |
|  | on a Basecoat | 68 | 74 | 74 | 75 | 73 | 70 | 47 | 74 | 77 | 50 |
| Blocking Resistance | Mesh Pass Rate (%) | 96 | 99 | 99 | 98 | 60 | 98 | 99 | 40 | 40 | 99 |
| Resistance to | Mw*) Change Rate (%) | 1.01 | 1.01 | 1.02 | 1.01 | 1.01 | 1.01 | 1.02 | 1.45 | 1.02 | 1.02 |

TABLE 3-continued

|  |  | Example No. | | | | Comp. Example No. | | | | | |
| --- | --- | --- | --- | --- | --- | --- | --- | --- | --- | --- | --- |
|  |  | 5 | 6 | 7 | 8 | 6 | 7 | 8 | 9 | 10 | 11 |
| Solid-Phase Reaction | NSIC Reduction (%) | 2 | 2 | 2 | 1 | X | 2 | 2 | X | X | 2 |
| Crosslinking Density | (mmol/cc) | 2.1 | 2.1 | 1.8 | 2.1 | 2.0 | 1.1 | 2.3 | 2.1 | 2.2 | 1.5 |
| Acid Resistance Test | | ○ | ○ | ○ | ○ | ○ | X | ○ | ○ | ○ | Δ |

*) Mw = Weight Average Molecular Weight

1. Surface smoothness

1) Surface smoothness of a coating film on an iron plate:

The particles for powder coating were electrostatically coated on an iron plate and baked at 145° C. for 25 minutes to form a coating film having a thickness of 50 μm. An appearance of the coating film was evaluated in terms of an NSIC value (%) as measured by an image sharpness measuring apparatus (manufactured by Suga testing machine Co., Ltd.). The coating films having an NSIC value of 70% or higher were rated as being satisfactory.

2) Surface smoothness of a coating film on a water-based basecoat:

A waterborne metallic basecoat ("SUPERLAC M260-SILVER", named in trade and manufactured by Nippon Paint Co., Ltd.) was electrostatically applied on an intercoated substrate to a thickness in the range of 10–20 μm, and provisionally heated in a hot-air oven controlled at 80° C. for 10 minutes. After the substrate was cooled to a room temperature, the particles for powder coating were coated electrostatically on the basecoat to a thickness of 50 μm and baked in the hot-air drying oven controlled at 145° C. for 25 minutes. Subsequent to baking, the substrate was taken out from the oven and left to stand. As the substrate temperature dropped to ambient, an appearance of the powder coating film was evaluated in terms of an NSIC value (%) as measured by an image sharpness measuring apparatus (manufactured by Suga testing machine Co., Ltd.). The powder coating films having an NSIC value of 65% or higher were rated as being satisfactory.

The aforementioned intercoated substrate was prepared by an electrodepositing coating for automobile ("POWERTOP U-50", named in trade and manufacture by Nippon Paint Co., Ltd.), as an undercoat, on a zinc phosphated dull steel plate to a dry thickness of about 25 μm, baking the undercoat at 160° C. for 30 minutes, electrostatically applying an intercoat ("ORGA P-2", named in trade and manufacture by Nippon Paint Co., Ltd.) on the undercoat to a dry thickness of about 25 μm, and baking the intercoat at 140° C. for 30 minutes.

2. Blocking resistance

The particles for powder coating were stored in a 30° C. incubator for 2 months and subsequently subjected to sieving with a vibrating 150-mesh screen. A powder coating, if a 95% or higher proportion thereof passed through the screen openings, was found as being satisfactory.

3. Resistance to solid-phase reaction

The particles for powder coating were stored in a 30° C. incubator for 2 months and subsequently measured with GPC for weight average molecular weight to determine a rate of change thereof, as well as subjected to the surface smoothness test on an iron plate as described above. A coating film, if exhibited less than 5% reduction in NSIC value, was found as being satisfactory.

4. Crosslinking density of a coating film

The particles for powder coating were coated and baked at 145° C. for 25 minutes to form a 50 μm thick film which was subsequently cut to obtain a 5 mm wide and 20 mm long free film. The free film was then placed under crosslinking density measurement by a forced stretching vibration type viscoelasticity tester ("VIBRON DDV-II", named in trade and manufactured by Toyo Boldwin Co., Ltd.) which operated at 11 Hz and 2° C./minute.

5. Acid resistance test

A coating film was formed from the particles for powder coating in the same manner as in the above-described surface smoothness test on an iron plate. A polyethylene ring having a diameter of 2–3 cm was secured onto the coating film. 2 ml of 1/10 N aqueous $H_2SO_4$ was poured into a space on the coating film surrounded by the ring and left to stand for 24 hours under the following conditions; temperature= 20±2° C., effective humidity=75% and windless. Subsequent to removal of the ring, the coating film was washed with water and air dried to visually observe its surface condition. The acid resistance of the coating film was evaluated based on the visual observation and its rating is given in Tables 2 and 3. In Tables 2 and 3, a rating "○" indicates that acid attack was scarcely traced, a rating "Δ" indicates that acid attack was traced, and a rating "x" indicates that acid attack was traced and a marked discoloration of a coating film was observed.

What is claimed is:

1. A method for manufacture of particles for powder coating comprising the steps of: mixing a thermosetting resin solution and an aqueous solution containing a water-soluble polymer, said thermosetting resin solution containing A resin, B resin and an organic solvent wherein:

(a) $0.5 \leq \{(SP\ value\ of\ the\ A\ resin) - (SP\ value\ of\ the\ B\ resin)\} \leq 1.5$;

(b) $\{(Tg\ of\ the\ A\ resin) - (Tg\ of\ the\ B\ resin)\} \leq 10°\ C.$ (c) $40°\ C. \leq (Tg\ of\ the\ A\ resin) \leq 100°\ C.$, and, $20°\ C. \leq (Tg\ of\ the\ B\ resin) <= 50°\ C.$; and (d) $5/95 \leq (a\ ratio\ in\ solids\ weight\ of\ the\ A\ resin\ to\ B\ resin) \leq 50/50$, thereby preparing a supension of particles;

distilling off said organic solvent from said particles so as to solidify said particles; and separating said solid particles from said suspension.

2. The method of claim 1 wherein said thermosetting resin solution further contains a curing agent.

3. The method of claim 1, wherein said water-soluble polymer comprises a mixture of a first water-soluble polymer which does not exhibit a cloud point and a second water-soluble polymer which exhibits a cloud point within a temperature range of 30–90° C., and wherein said method includes the steps of:

(1) preparing said suspension at a first temperature below said cloud point;
(2) heating said suspension to a second temperature higher than the first temperature but below the cloud point to form primary particles therein; and
(3) heating the primary particle-containing suspension to a third temperature equal to or higher than the cloud point to form secondary particles therein.

4. The method of claim 1 wherein said A and B resins both consist essentially of an acrylic resin.

5. The method of claim 4 wherein the A resin has a number average molecular weight in the range of 2,000–4,000 and the B resin has a number average molecular weight in the range of 5,000–10,000.

6. The method of claim 4, wherein each of the A and B resins have an epoxy group and said theremosetting resin solution further contains, as a curing agent, a polycarboxylic acid.

* * * * *